June 30, 1970  J. MORKOSKI  3,517,751
FLEXIBLE GANG HARROW

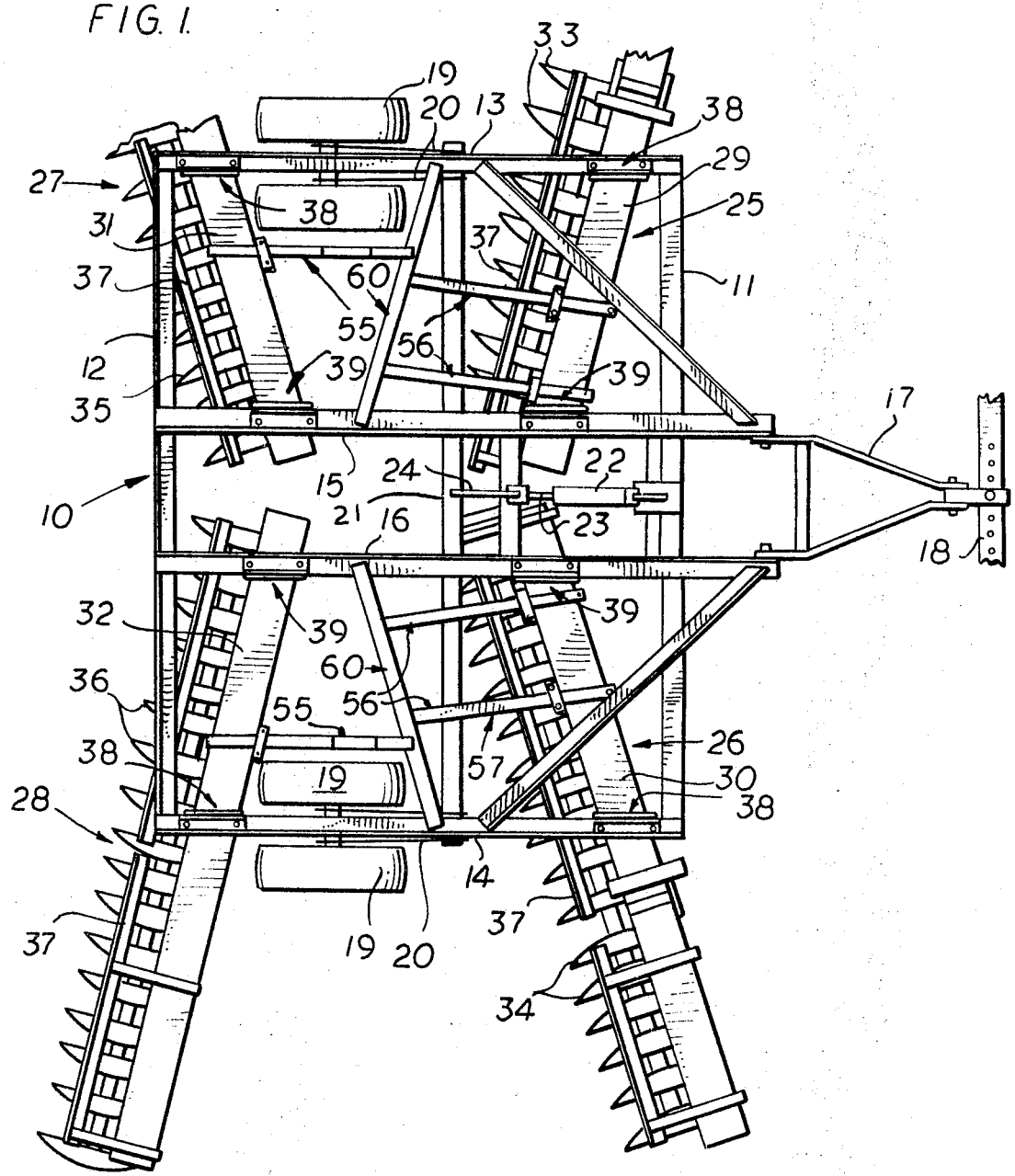

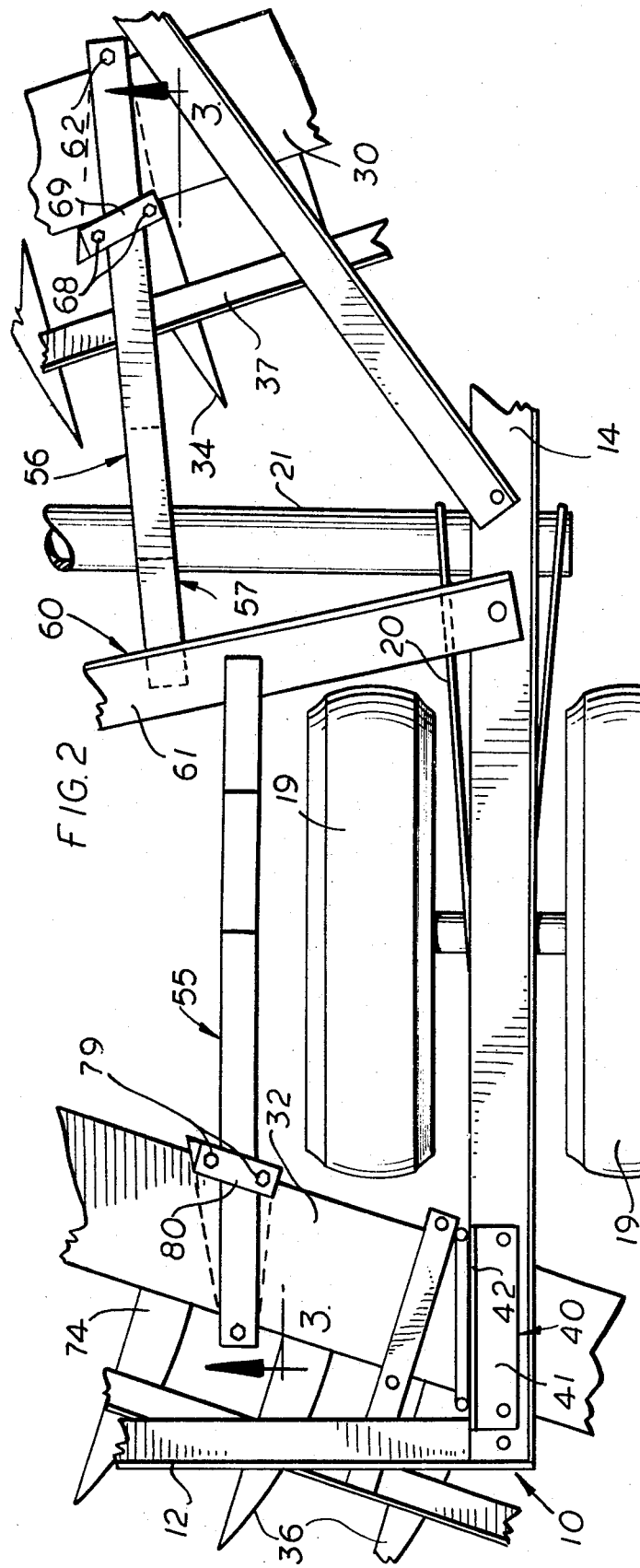
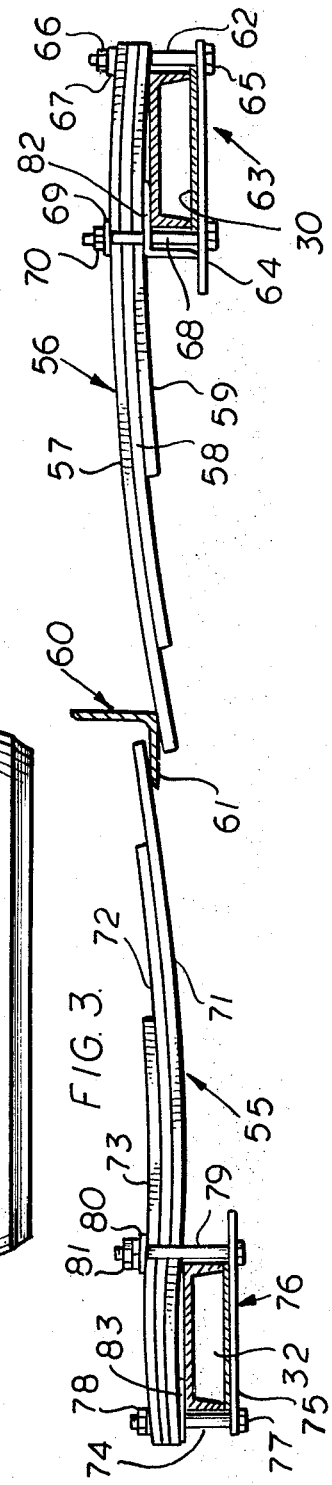

Filed Feb. 9, 1968  4 Sheets-Sheet 3

INVENTOR
JAMES MORKOSKI
ATT'Y

June 30, 1970 J. MORKOSKI 3,517,751
FLEXIBLE GANG HARROW
Filed Feb. 9, 1968 4 Sheets-Sheet 4

INVENTOR
JAMES MORKOSKI
ATT'Y

United States Patent Office 3,517,751
Patented June 30, 1970

3,517,751
FLEXIBLE GANG HARROW
James Morkoski, Clarendon Hills, Ill., assignor to International Harvester Company, Chicago, Ill., a corporation of Delaware
Filed Feb. 9, 1968, Ser. No. 704,423
Int. Cl. A01b 35/28
U.S. Cl. 172—572          5 Claims

ABSTRACT OF THE DISCLOSURE

In a disk harrow of the tandem type each of the rectangular front and rear disk carrying transverse beams is secured to the supporting frame by pivot and cushion means allowing the beam to be disposed generally horizontally in operation but allowing it to swing rearwardly and upwardly relative to the frame when obstructions are encountered.

BACKGROUND OF THE INVENTION

This invention relates to agricultural implements and particularly to a disk harrow of the tandem type. More specifically, the invention concerns novel cushioning means for the gangs of a disk harrow to minimize the likelihood of damage to the disks when obstructions are encountered during operation of the implement.

Customarily a disk harrow of the tandem type comprises a generally rectangular frame structure from the underside of which are suspended at least two longitudinally spaced gangs of disks in tandem relation. The frame is frequently supported by wheels which are raised out of the way during operation and are used mainly for transport purposes. Each disk gang comprises a horizontal beam, rectangular in cross section, rigidly secured to the frame and from which the disks are rigidly suspended. In such conventional construction engagement of one or more disks of the front or rear gang with an obstruction causes the entire implement to rise, frequently damaging the disks and other components of the implement.

Previous efforts toward protecting disk harrows against shocks incurred in operation have been in the direction of providing cushioning between the disks and the beam on which they are mounted. When needed, disk scrapers are customarily and preferably mounted on the beam from which the disks are suspended, one scraper extending downwardly therefrom to each disk. The motion of the sprung disk relative to the beam when obstructions are encountered destroys the relationship between the scraper and the disk, rendering the scraper temporarily ineffective. The present invention, therefore, is designed to provide novel cushioning means for the disks of a harrow wherein the foregoing disadvantage is avoided and the relationship of the scrapers to the disks maintained unimpaired during operation when obstacles are encountered. This is accomplished by maintaining a fixed relationship between the disks and their supporting beam and freeing the beam for angular movement relative to its supporting frame, the cushioning means of this invention being effective to bias the beam and its disk to operating position under normal operating conditions but yieldable to accommodate swinging of the beam with its disks rearwardly and upwardly relative to the supporting frame when obstructions are encountered by the disks. Cushioning means performing a similar function is disclosed in copending U.S. application Ser. No. 688,856 filed Dec. 7, 1967.

DESCRIPTION OF THE DRAWINGS

FIG. 1 is a diagrammatic plan view of a portion of a tandem disk harrow incorporating the features of this invention;

FIG. 2 is an enlarged detail in plan of a portion of the structure shown in FIG. 1;

FIG. 3 is a sectional view with parts removed taken on the line 3—3 of FIG. 2;

DESCRIPTION OF THE PREFERRED EMBODIMENT

Figure 4:
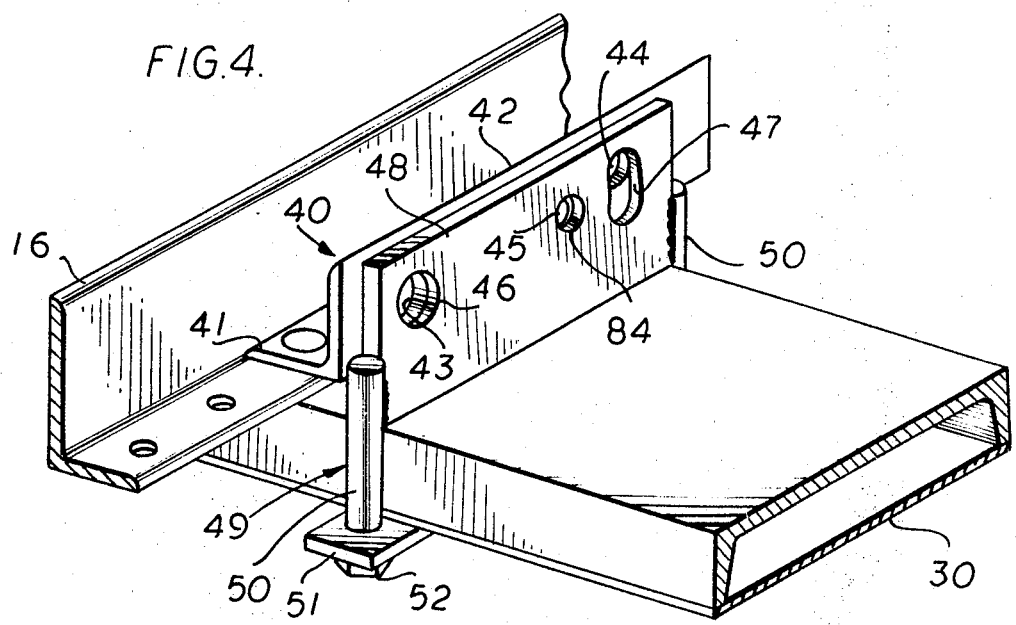
FIG. 4 is an enlarged detail in perspective of a portion of the disk gang mounting of this invention.

The numeral 10 designates the rectangular supporting frame of a tandem disk harrow, including front and rear transversely extending frame members 11 and 12, respectively, in the form of angle bars.

Frame members 11 and 12 are connected at the ends by side members 13 and 14 and centrally by elongated members 15 and 16, all in the shape of angle bars, central frame members 15 and 16 projecting forwardly of frame member 11 for connection to the rear end of a hitch structure 17 pivotally connected to the drawbar 18 of a tractor for vertical movement relative thereto.

The frame 10 is supported by laterally spaced pairs of wheels 19 carried at the ends of rearwardly extending arms 20 comprising spaced members affixed to a transverse rockshaft 21 rockably mounted in well-known manner on the implement frame for swinging the wheels 19 in a vertical plane between operating and transport positions of the implement. Rocking of the shaft 21 is effected by the provision of a hydraulic cylinder 22 pivotally anchored to frame member 11 and having a piston rod 23 slidable therein and connected to one end of an arm 24 affixed to shaft 21.

Implement frame 10 forms the support for a forward pair of laterally spaced rearwardly converging left and right-hand disk gangs 25 and 26 and a rear pair of laterally spaced forwardly converging left and right-hand disk gangs 27 and 28, respectively. Forward gangs 25 and 26 comprise horizontally disposed gang bars or beams 29 and 30, respectively, and rear gangs 27 and 28 comprise left and right-hand beams 31 and 32, respectively.

Figure 5:
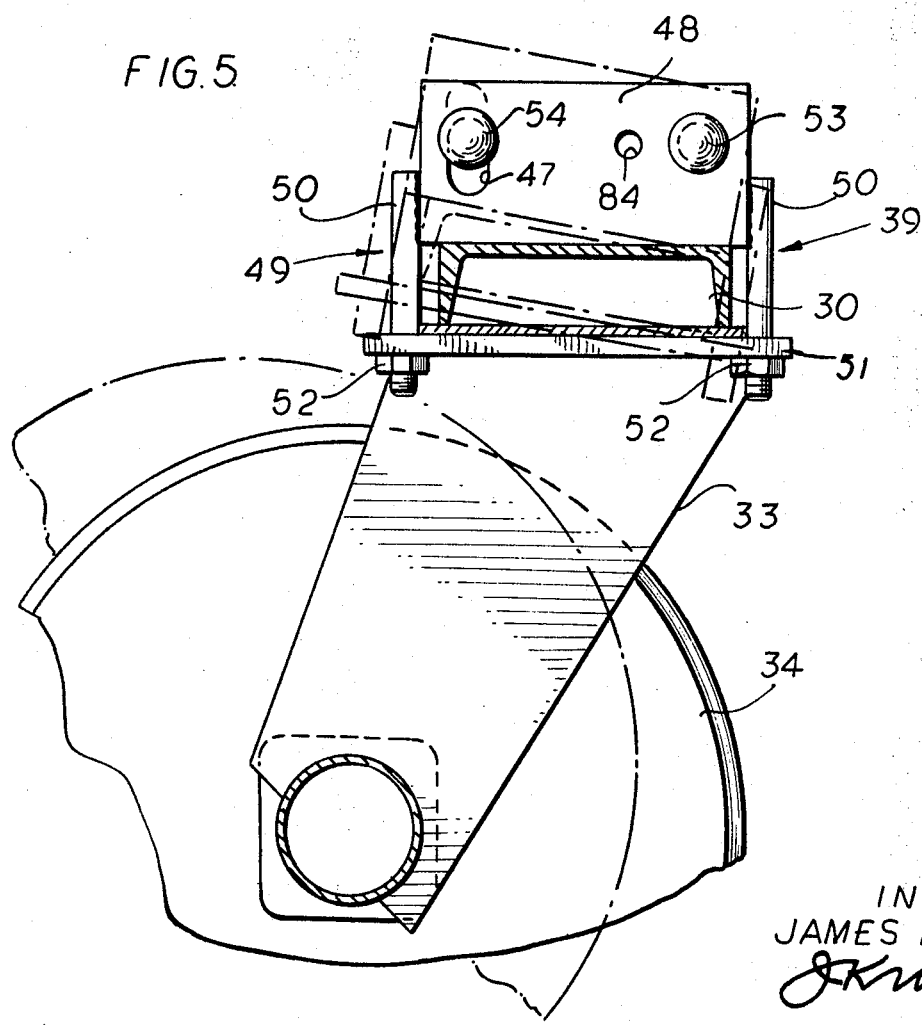
FIG. 5 is an enlarged sectional view of a portion of the structure shown in FIGS. 1 and 2.

Oppositely facing disks 33 and 34 are secured to beams 29 and 30 in a well-known manner by hangers 33 shown in FIG. 5, inwardly facing disks 35 and 36 being similarly suspended from beams 31 and 32. It may be understood that bars 37 affixed to each of the beams 29, 30, 31 and 32 support conventional scrapers, not shown, extending downwardly into operative engagement with the earthworking disks.

Each of the left-hand beams 29 and 31 is mounted on outer and inner frame bars 13 and 15, and each of the right-hand beams 30 and 32 is mounted on outer and inner longitudinally extending frame bars 14 and 16 by outer and inner mounting means 38 and 39, respectively. Since the mounting assemblies 38 and 39 differ from each other only in being oppositely disposed on their respective frame bars, the description of one will suffice for all.

Each of the mounting assemblies 38 and 39 comprises an angle bar 40 having a horizontal flange 41 affixed to central frame bar 16 and having an upright flange 42 having a pair of longitudinally spaced openings 43 and 44 therein and a third opening 45. Forwardmost opening 43 is registrable with an opening 46 and rearmost opening 44 is registrable with a vertically disposed arcuately shaped slot 47 formed in an upright plate 48 forming part of a clamping structure 49 including rods 50 affixed, as by welding, to opposite edges of plate 48, depending therebelow and straddling the front and rear faces of beam 30. The lower ends of rods 50 are received in apertures in a clamping bar 51 engaging the lower face of beam 30, and are threaded to receive nuts 52 by which the clamping structure is affixed to beam 30. It may be understood that a clamping structure 49 is provided for securing each of the disk carrying beams 29, 30, 31 and 32 to its associated frame bars 13, 14, 15 and 16.

A pivot bolt 53 (see FIG. 5) is adapted to be received in the registering openings 43 and 46, and a lost motion connection is provided accommodating swinging movement upwardly and rearwardly of each of the disk carrying beams 29, 30, 31 and 32 from an operating position, such as indicated in solid lines in FIG. 5, to the dotted line position thereof, about the axis of pivot bolt 53. Another bolt 54 is received in opening 44 and slot 47 to limit the swinging movement of the beam and disks.

Movement of the disk gang from the solid line to the dotted line position of FIG. 5 is resisted by cushioning means in the form of a leaf spring assembly 55 extending forwardly, cantilever fashion from the rear beams 31 and 32, and a pair of leaf spring assemblies 56 extending rearwardly from forward beams 29 and 30, as shown in FIG. 1.

In FIG. 3 is shown the right-hand assembly 55 and one of the spring assemblies 56, spring assembly 55 being secured at its rear end to right-hand gang beam 32 and extending forwardly therefrom, and each of the spring assemblies 56 being anchored at its forward end to right-hand beam 30 and extending rearwardly therefrom.

Spring assembly 56 shown in FIG. 3 comprises an elongated upper section 57 and lower successively shorter sections 58 and 59, the rear end of section 57 projecting rearwardly below and in engagement with a resistance member in the form of an angle bar stop member 60 extending between and secured to frame bars 14 and 16, and having a horizontal flange 61, a similar angle bar 60 being provided on the left side of the implement and secured to bars 13 and 15. As shown in FIG. 1, the spring assemblies 56 engage the bar 60 at laterally spaced locations.

The forward end of each assembly 56 is apertured to receive a bolt 62 engaging the forward edge of beam 30 and forming part of a clamping structure 63 including a plate 64 engaging the lower face of beam 30 and also apertured to receive bolt 62, the latter having a head 65 and threaded at its upper end to receive a nut 66 separated from the spring assembly by a washer 67. Plate 64 also has spaced openings to receive a pair of bolts 68 engaging the rear edge of beam 30 and extending upwardly on opposite sides of spring assembly 56 for reception in openings provided in a transverse plate 69, the bolts being secured in place by nuts 70.

In a manner similar to assembly 56 in reverse, spring assembly 55 comprises an elongated lower section 71 and successively shorter sections 72 and 73 and is apertured at its rear end to receive a bolt 74 the lower end of which passes through a plate 75 forming part of a clamping assembly 76 and engaging the lower face of beam 32. The lower end of bolt 74 is provided with a head 77 and its upper end is threaded to receive a nut 78. Plate 75 is also provided with openings to receive a pair of laterally spaced bolts 79 engaging the forward edge of beam 32 and straddling leaf spring assembly 55. The upper ends of bolts 79 project through openings in a plate 80 and are threaded to receive nuts 81.

Spring assembly 56 is pretensioned to bear upwardly against the angle bar stop 60 by the provision of an insert 82 in the form of an angle bar having its horizontal flange apertured to receive bolts 68 and wedged between the lower leaf spring 61 and the rear upper edge of beam 30. Similarly, spring assembly 55 is pretensioned downwardly to bear against the flange 61 by the provision of an insert 83 apertured to receive bolts 74 and wedged between the rear end of lower leaf spring 71 and the rear upper edge of beam 32.

In operation, when the disks supported by beam 30 or 32 engage an obstruction, the beam and its disks swing rearwardly and upwardly about the axis of pivot bolt 53, shock being cushioned by spring assembly 56 bearing upwardly against the bar 60. Engagement of the disks carried by rear beam 30 with an obstruction causes them to swing rearwardly and upwardly, and causing assembly 55 to bear downwardly against the flange 61 of bar 60.

When the cushioning action is not required or desired it is locked out and the implement operated as a conventional harrow by causing opening 45 in flange 42 to register with an opening 84 in plate 48 and inserting a bolt or the like to rigidly connect the parts.

Figure 6:
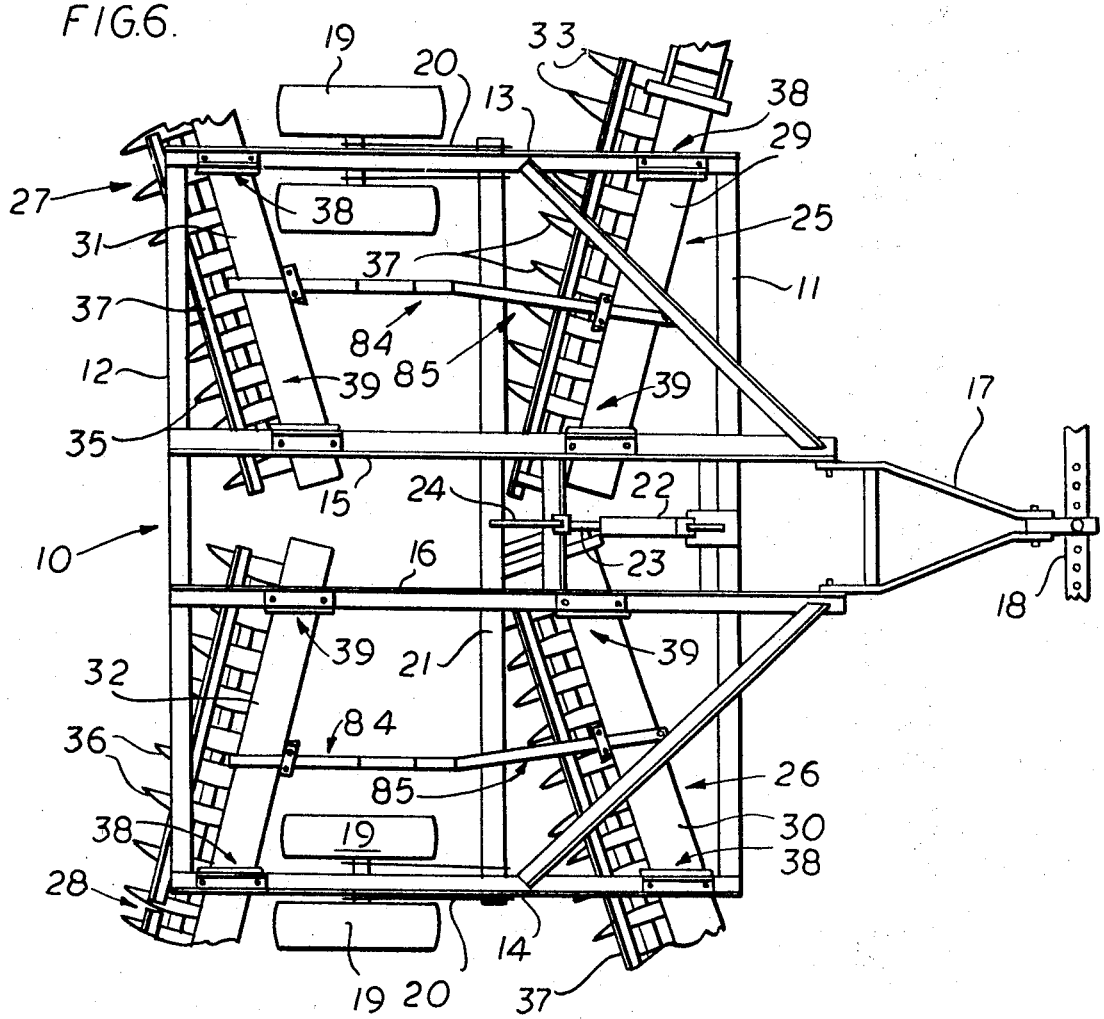
FIG. 6 is a view similar to FIG. 1 of a modified form of the invention.
Figure 7:
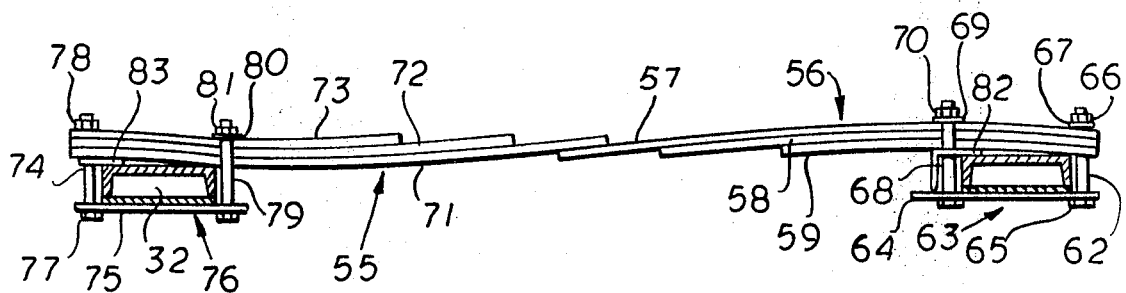
FIG. 7 is a sectional view similar to FIG. 3, of the modified form of the invention shown in FIG. 6.

In the modified form of the invention shown in FIGS. 6 and 7, a single leaf spring assembly 84 is secured to and extends forwardly from each of the rear disk gang beams 31 and 32 and a single leaf spring assembly 84 is secured to and extends rearwardly from each of the front gang beams 29 and 30. Each spring assembly 84 and 85 is a substantial duplicate of corresponding assemblies 55 and 56 in FIGS. 1 to 5, but the ends of leafs 57 and 71 are in lapping relation and in operative engagement with each other.

Spring assembly 56 is pretensioned in the manner described for the structure of FIGS. 1 to 5, to bear upwardly against the overlapping end of leaf spring 71, and similarly spring assembly 55 is pretensioned downwardly to bear against the end of leaf 57. In operation, when the disks supported by beam 30 or 32 engage an obstruction, the beam and its disks swing rearwardly and upwardly in the manner previously described about the axis of pivot bolt 53, shock being cushioned by spring assembly 56 bearing upwardly against the bias in rear spring assembly 55. Engagement of the disks carried by rear beam 30 with an obstruction causes them to swing rearwardly and upwardly, causing assembly 55 to bear downwardly against the rear end of spring assembly 56.

It is believed that the construction and operation of the novel cushioning means for disk harrow gangs will be clearly understood from the foregoing description. It should likewise be understood that the invention has been described in its preferred embodiment and that modifications may be made therein without departing from the spirit of the invention or the scope of the appended claims.

What is claimed is:

1. In a disk harrow having a main frame and longitudinally spaced transversely extending disk carrying beams disposed below and said main frame, connecting means between the main frame and each of said disk carrying beams, said connecting means comprising transverse pivot means connecting each said disk carrying beam to the main frame, a lost motion connection between the main frame and said disk carrying beam at a location longitudinally spaced from said pivot means accommodating angular movement of said disk carrying beam upwardly and rearwardly in a vertical plane about the axis of said pivot means, and cushioning means secured to and extending between said longitudinally spaced disk carrying beams and operatively engageable with said main frame to yieldably oppose said angular movement of at least one of said beams about the axis of said pivot means, said connecting means between each of said disk carrying beams and the main frame is provided at laterally spaced locations and said cushioning means extends between said longitudinally spaced disk carrying beams medally of the ends thereof and between the connections of said disk carrying beams to the main frame.

2. In a disk harrow having a main frame and longitudinally spaced transversely extending disk carrying beams disposed below said main frame, connecting means between the main frame and each of said disk carrying beams, said connecting means comprising transverse pivot means connecting each said disk carrying beam to the main frame, a lost motion connection between the main frame and said disk carrying beam at a location longitudinally spaced from said pivot means accommodating angular movement of said disk carrying beam upwardly and rearwardly in a vertical plane about the axis of said pivot means, and cushioning means secured to and extending between said longitudinally spaced disk carrying beams and operatively engageable with said main frame to yieldably oppose said angular movement of at least one of said beams about the axis of said pivot means, said cushioning means comprises a pair of leaf spring means each secured at one end to the respective of said longitudinally spaced disk carrying beams and extending toward each other, each said leaf spring means being engageable with said main frame in a direction to yeldably oppose angular movement of the respective of said disk carrying beams about said pivot means wherein each of said beams is rectangular in cross-section and said pivot means is disposed adjacent the rear edge of said beam, and one of said leaf spring means is secured to the forwardmost of said beams and extends rearwardly therefrom, and the other of said leaf spring means is secured to the rearmost of said beams and extends forwardly therefrom with the forward end thereof in overlapping relation to the rear end of said one of said leaf spring means, and a part on said main frame extends between and in engagement with said leaf spring means.

3. In a disk harrow having a main frame and longitudinally spaced transversely extending disk carrying beams disposed below said main frame, connecting means between the main frame and each of said disk carrying beams, said connecting means comprising transverse pivot means connecting each of said disk carrying beams to the main frame, a lost-motion connection between the main frame and said disk carrying beams at a location longitudinally spaced from said pivot means accommodating angular movement of said disk carrying beam upwardly and rearwardly in a vertical plane about the axis of said pivot means, and cushioning means secured to and extending between said longitudinally spaced disk carrying beams and operatively engageable with each other to yieldably oppose said angular movement of at least one of said beams about the axis of said pivot means.

4. The invention set forth in claim 3, wherein said cushioning means comprises a pair of leaf spring means each secured at one end to the respective of said longitudinally spaced disk carrying beams and extending toward each other in overlapping relationship to yieldably oppose angular movement of the respective of said disk carrying beams about said pivot means.

5. The invention set forth in claim 4, wherein one of said leaf spring means is secured to the forwardmost of said beams and extends rearwardly therefrom, and the other of said leaf spring means is secured to the rearmost of said beams and extends forwardly therefrom with the forward end thereof in overlapping relation to the rear end of said one of said leaf spring means.

References Cited

UNITED STATES PATENTS

| | | | |
|---|---|---|---|
| 445,871 | 2/1891 | Bailey et al. | 172—711 X |
| 833,028 | 10/1906 | De Loach | 172—572 |
| 1,286,986 | 12/1918 | French | 172—572 |
| 1,337,425 | 4/1920 | Babcock et al. | 172—572 X |
| 1,386,132 | 8/1921 | Rodemeyer | 172—572 X |
| 3,442,336 | 5/1969 | Morkoski | 172—572 |

FOREIGN PATENTS 80,576  4/1934  Sweden.

ROBERT E. PULFREY, Primary Examiner

J. W. PETERSON, Assistant Examiner

U.S. Cl. X.R.

172—711, 657; 267—1